Dec. 11, 1934.  E. P. WILSON  1,984,102
APPARATUS FOR FORMING VEHICLE WIRE WHEEL SPOKES
Filed Oct. 12, 1931  6 Sheets-Sheet 1
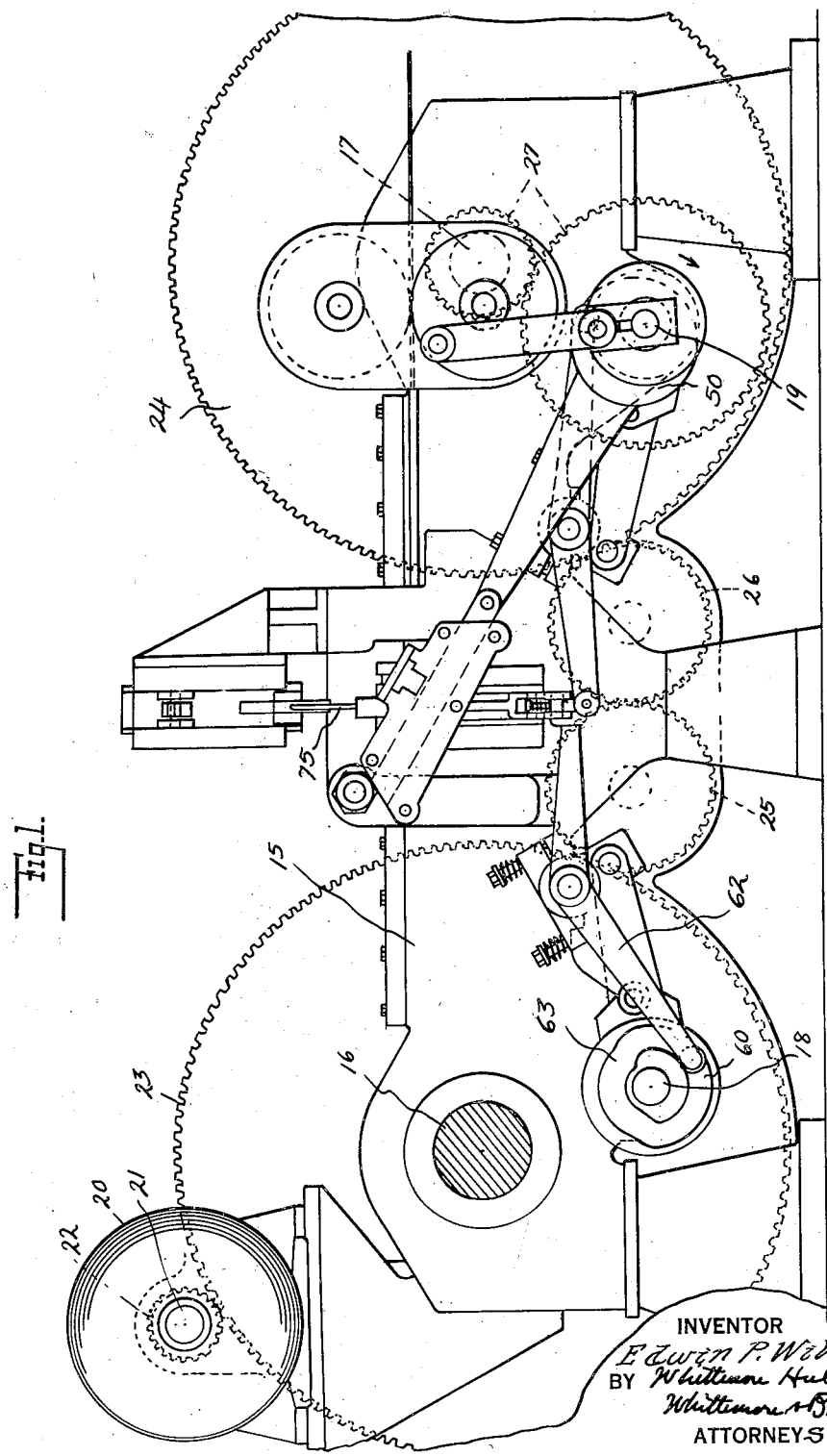

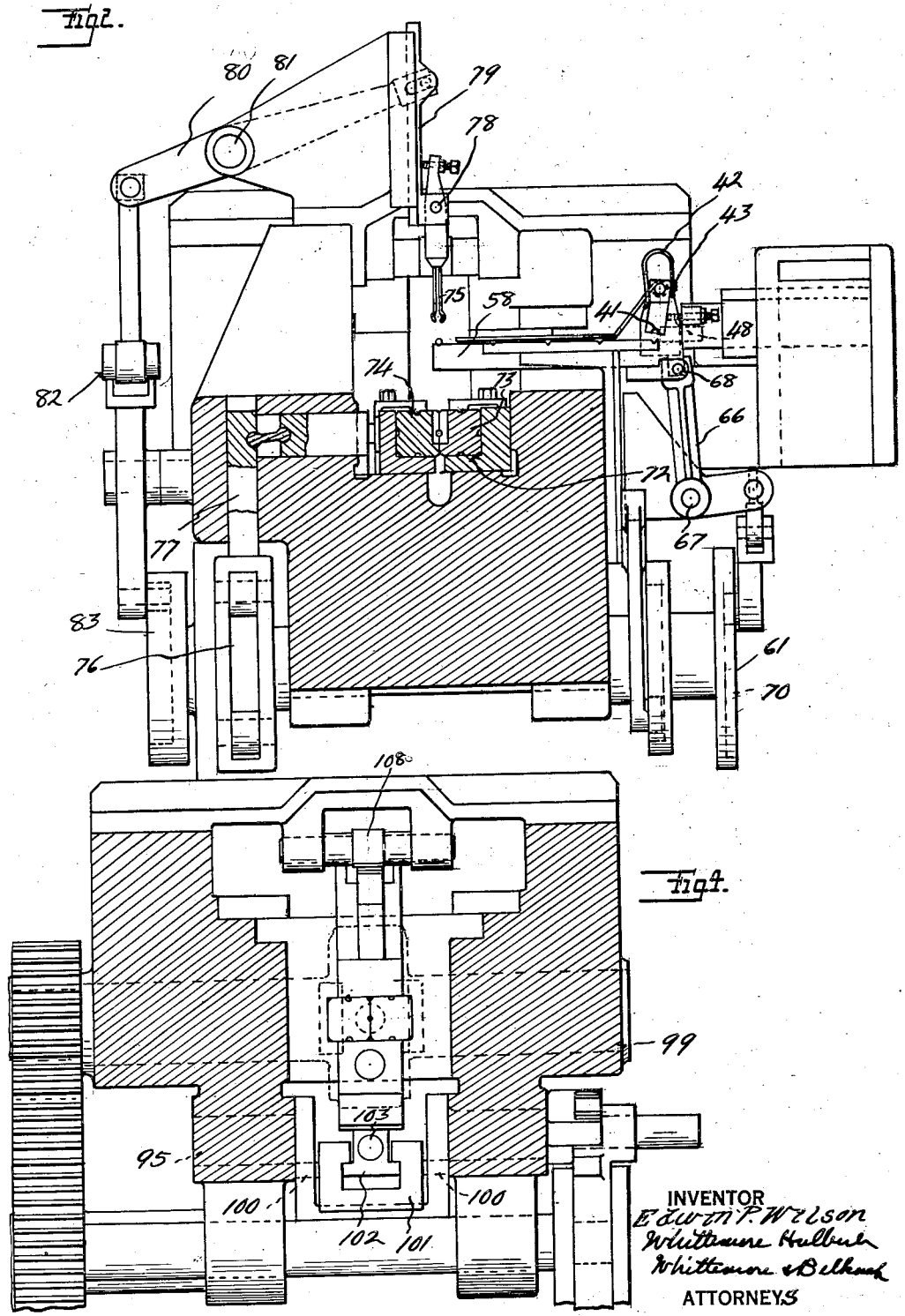

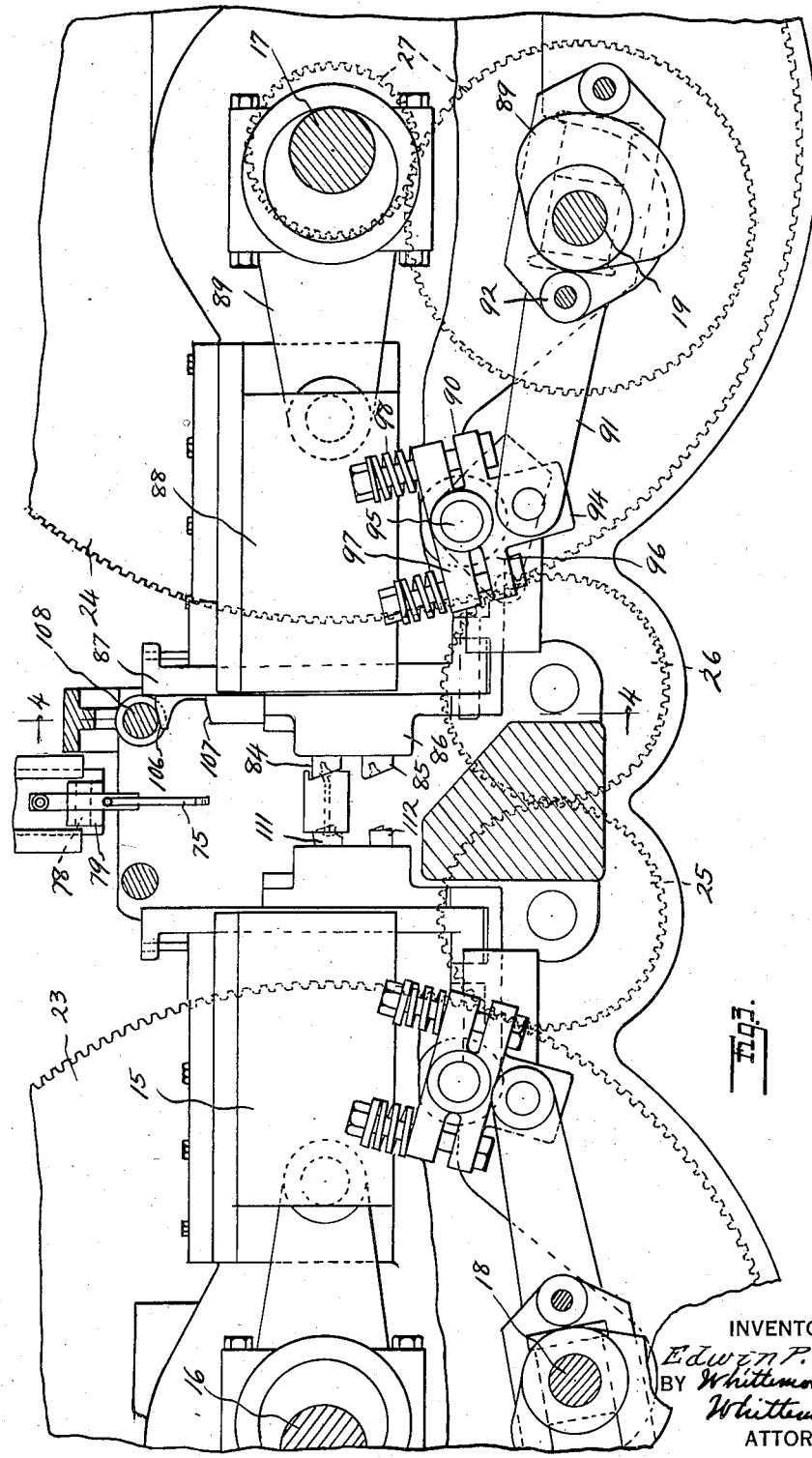

Dec. 11, 1934. E. P. WILSON 1,984,102
APPARATUS FOR FORMING VEHICLE WIRE WHEEL SPOKES
Filed Oct. 12, 1931 6 Sheets-Sheet 4
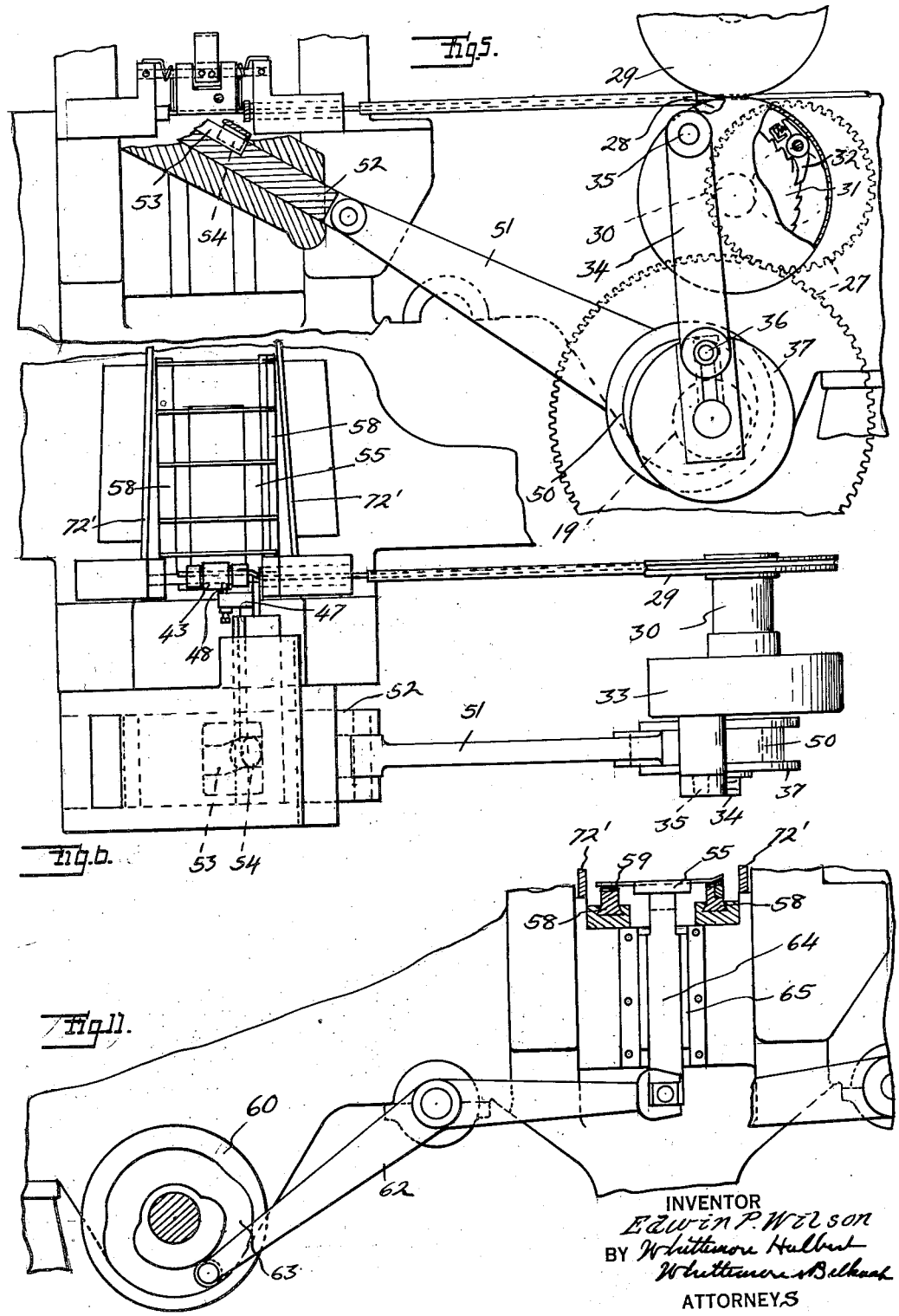

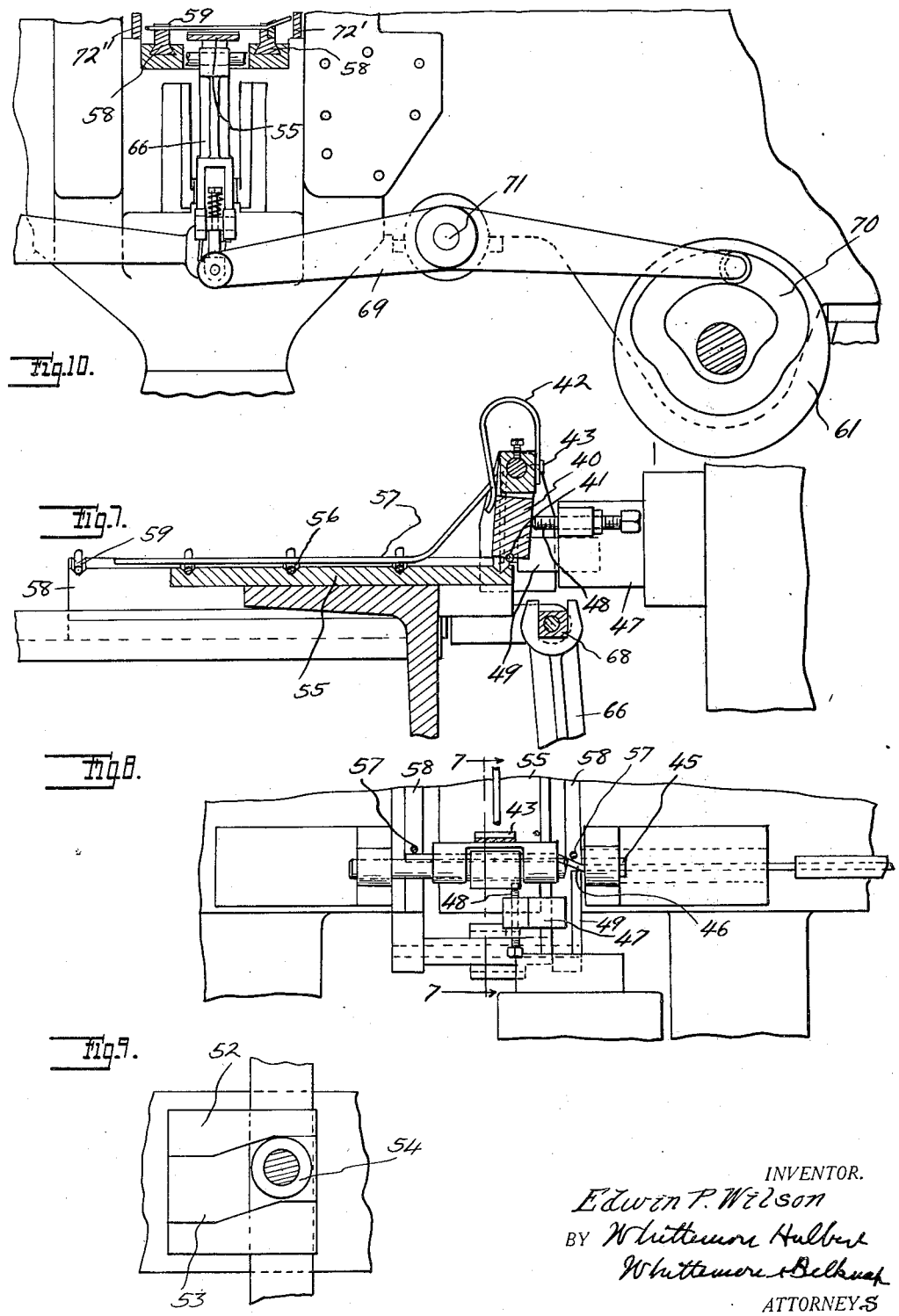

Dec. 11, 1934.    E. P. WILSON    1,984,102
APPARATUS FOR FORMING VEHICLE WIRE WHEEL SPOKES
Filed Oct. 12, 1931    6 Sheets-Sheet 6
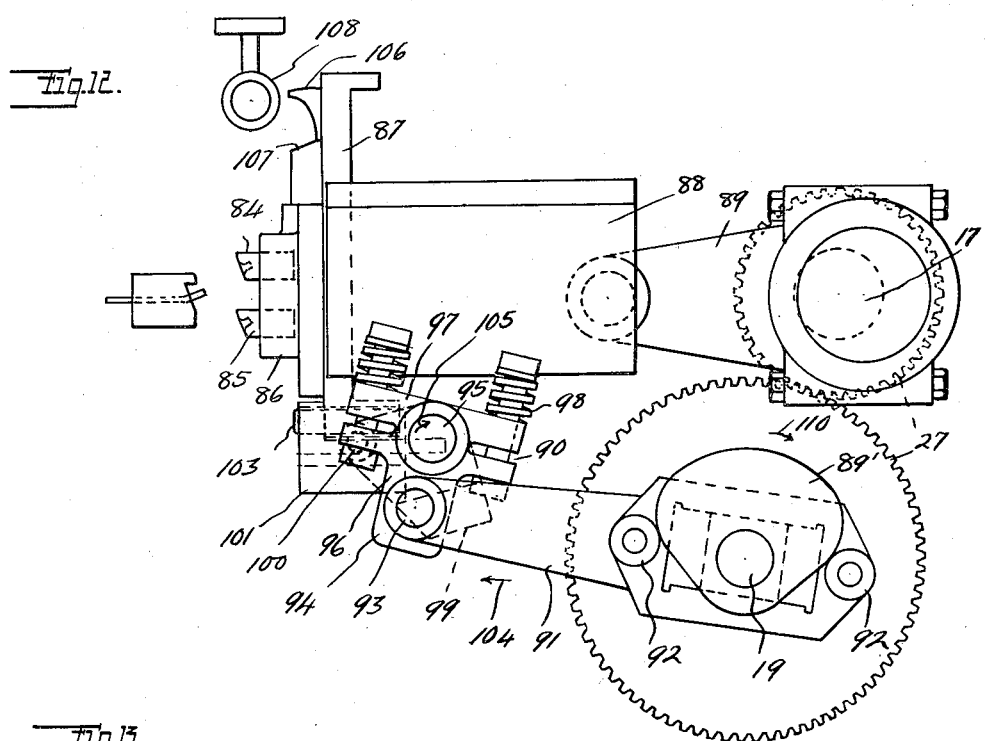
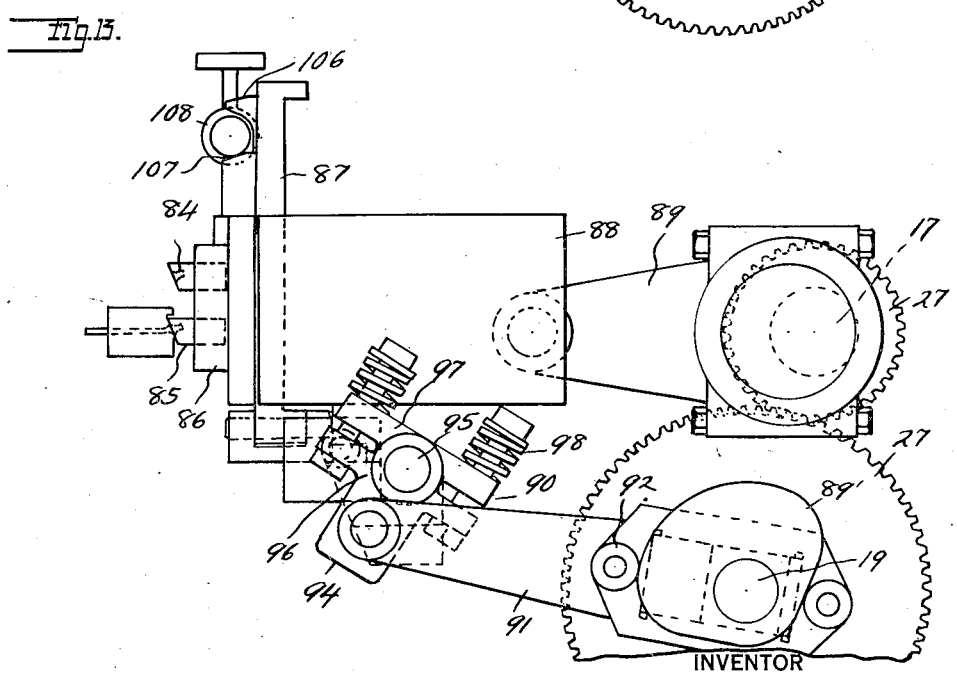

Patented Dec. 11, 1934

1,984,102

UNITED STATES PATENT OFFICE 1,984,102

APPARATUS FOR FORMING VEHICLE WIRE WHEEL SPOKES

Edwin P. Wilson, Detroit, Mich., assignor to Kelsey-Hayes Wheel Corporation, Detroit, Mich., a corporation of New York Application October 12, 1931, Serial No. 568,497

8 Claims. (Cl. 29—34)

This invention relates generally to wire fashioning machines and more particularly to an improved apparatus for forming wire spokes of the type employed in the manufacture of vehicle wire wheels.

Although the present invention may be utilized in manufacturing numerous different designs of wire spokes, nevertheless, it finds particular utility when employed in fashioning spokes of the type having tenons or end portions extending at an angle to the body portion of the spokes and in addition, having enlarged portions or heads upon the tenons for engaging the part of the wheel through which the tenons are adapted to extend.

Heretofore, in manufacturing spokes of the general type set forth in the preceding paragraph, it has been customary to bend the tenons or end portions of the spokes subsequent to forming the enlarged or head portions on the tenons. In other words, in the method of fashioning wire spokes heretofore commercially employed, the spokes were first headed by suitable apparatus and subsequently removed from this apparatus and introduced to separate and especially formed bending mechanism for displacing the tenon portions of the spokes laterally relative to the body portions of the same. The foregoing arrangement has been found objectionable not only due to the excessive handling of the spokes during the fashioning operation thereof which obviously materially retards production, but also due to the expense involved.

The present invention contemplates simplifying and reducing the cost of manufacture of wire spokes as well as providing for increasing production thereof by introducing an apparatus capable of fashioning completed wire spokes of the bent tenon type from wire stock by a continuous operation with the minimum amount of handling.

In the specific embodiment of the invention the tenon portions of the spokes are bent prior to fashioning the enlarged head portions on the latter and accordingly one of the principal objects of this invention consists in the manner in which the enlarged head portions of the spokes are fashioned upon the inclined or angularly arranged tenons of the spokes.

Another advantageous feature of this invention resides in the relatively simple means employed for bending the tenon portions of the spokes relative to the body portions thereof.

A further object of this invention resides in the expedient and relatively simple manner in which the spokes are completely fashioned by apparatus which is thoroughly automatic in operation and extremely compact and simple in construction.

The foregoing objects as well as other objects of this invention will be made more apparent as this description proceeds, especially when considered in connection with the accompanying drawings, wherein:

Figure 1 is a fragmentary side elevational view of one form of apparatus suitable for performing the several operations in the method of fashioning wire spokes;

Figure 2 is a transverse sectional view through portions of the apparatus shown in Figure 1;

Figure 3 is a view similar to Figure 1 with certain parts broken away to illustrate the spoke heading mechanism;

Figure 4 is a cross-sectional view taken substantially on the line 4—4 of Figure 3;

Figure 5 is a fragmentary side elevational view of the apparatus featuring the stock feeding and spoke bending mechanisms;

Figure 6 is a plan view of the construction illustrated in Figure 5;

Figure 7 is a sectional view taken substantially on the line 7—7 of Figure 8;

Figure 8 is a fragmentary plan view of the construction illustrated in Figure 7;

Figure 9 is a detail elevational view showing the means for actuating the spoke bending and severing means;

Figures 10 and 11 are fragmentary elevational views featuring the means for actuating the spoke handling mechanisms;

Figures 12 and 13 are enlarged elevational views of the spoke heading mechanisms.

In general, wire stock suitable for fashioning wire wheel spokes is fed intermittently to bending and severing devices by suitable feed mechanism. The length of stock advanced during the intervals of movement of the stock is accurately controlled and capable of being regulated so as to provide for obtaining spokes of various predetermined lengths. After a predetermined length of stock has been fed to the bending and severing mechanisms and during the interval of rest of the feeding mechanism, the advanced portion of the stock representing the length of the completed spoke is displaced laterally relative to the remaining portions of the stock in such a manner as to secure the angularly arranged tenon portions of the spokes. Upon completion of the bending operation, the advanced portion of the stock is severed from the remainder of the stock at a point to form a spoke blank with the angularly disposed tenon at one end thereof whereupon the spoke blank is conveyed to a suitable gripping die. The tenon portion of the spoke is then introduced to heading dies which serve to form an enlarged head or seat portion on the tenon of the spoke. As will be presently described, the heading dies and associated mechanism is so designed that the component of the heading force produced by the dies is exerted in a direction in alignment with the angularly arranged tenon portions of the spokes, thereby providing for obtaining an annular seat on the tenon portions of the spokes substantially concentric with the axis of the tenon portions.

Referring now more in detail to the specific form of apparatus illustrated herein for performing the several operations briefly outlined above and with special reference to Figure 1, it will be noted that the apparatus comprises a frame 15 fashioned to support the various mechanisms for performing the several operations on the spokes. Journaled in the frame 15 adjacent the front and rear ends thereof is a pair of crank shafts 16 and 17, respectively, and also a pair of cam shafts 18 and 19, respectively. The crank shafts may be driven by a suitable prime mover 20 supported upon the frame and having a drive shaft 21 provided with a gear 22 adapted to mesh with a gear 23 which in turn is secured to the crank shaft 16. The gear 23 is operatively connected to a correspondingly sized gear 24 secured to the crank shaft 17 through the intermediary of a pair of intermeshing idler gears 25 and 26 carried by the frame 15. The cam shafts 18 and 19 are adapted to be driven from the crank shafts 16 and 17, respectively, through suitable gearing designated generally by the reference character 27.

As previously stated, the apparatus is provided with mechanism for intermittently feeding predetermined lengths of wire stock to the bending and severing mechanisms which will be more fully hereinafter described. The feeding mechanism is illustrated in detail in Figure 5 and comprises a feed roll 28 located below the path of travel of the wire stock and a pressure roll 29 positioned above the feed roll and cooperating therewith to frictionally grip opposite sides of the wire stock. The feed roll 28 is secured to a suitable stub shaft 30 operatively connected through suitable indexing mechanism to the cam shaft 19 for oscillation thereby. In detail, the stub shaft 30 has secured to the outer end thereof a ratchet wheel 31 having teeth for engaging a suitable pawl 32 which in turn is carried by a circular housing 33 journaled upon the stub shaft for rotation relative thereto. The housing 33 is operatively connected to the cam shaft 19 through the medium of a link 34 having the upper end thereof pivotally connected to the housing as at 35 at a point spaced radially from the axis of rotation of the housing. The lower end of the link 34 is pivotally connected as at 36 to a suitable disk 37 which in turn is secured to the cam shaft 19 for rotation therewith as a unit. The arrangement is such that the distance between the pivotal connection of the lower end of the link to the disk and the axis of rotation of the latter is substantially less than the corresponding distance between the pivotal connection of the upper end of the link to the housing 33 and the axis of rotation of the latter so that a complete rotation of the lower end of the link about the axis of the cam shaft 19 will merely effect an oscillation of the housing 33. Thus, it will be apparent that since the housing 33 is connected to the feed roll shaft 30 by means of the ratchet and pawl 31 and 32, the feed roll 28 will be positively driven in one direction a distance corresponding to the movement of the housing 33 by the cam shaft in the said direction and will be unaffected by movement of the housing in the opposite direction due to the fact that when the housing is oscillated in this latter direction, the pawl merely slides over the ratchet teeth. In other words, oscillation of the feed roll by the mechanism just described effects a rectilinear movement of the wire stock a distance corresponding to the oscillation of the roll which in turn governs the length of the spokes ultimately produced.

Since the extent of oscillation of the feed roll controls the length of the spokes ultimately produced, it is desirable to provide some means whereby the length of wire stock fed by the feed rolls during oscillation thereof may be varied. This is accomplished herein by varying the distance between the pivotal connection 36 and the axis of rotation of the cam shaft. In other words, the pivotal connection 36 is capable of radial sliding movement upon the disk 37 relative to the axis of rotation of the cam shaft so as to provide for varying the distance between the latter axis and the point of pivotal connection 36, with the result that the extent of oscillation of the feed roll 28 will be correspondingly varied. By reason of the foregoing, it is obvious that the length of stock fed to the machine may be accurately controlled and accordingly, the length of the spokes may be predetermined to relatively close limits.

After the desired length of stock corresponding to the length of a finished spoke has been fed to the bending and severing mechanisms, the latter functions to displace the portion of the stock corresponding to the length of the spoke laterally from the remaining portions of the stock so as to provide the angularly arranged tenon portion of the spoke. The foregoing is accomplished in the present instance by providing a hinged die member 40 having a groove 41 in the swinging edge thereof of sufficient dimension to receive the wire stock and normally positioned in the path of travel of the stock by means of a spring 42 having one end fixed as at 43 and the opposite end yieldably engaging the die block 40 as shown particularly in Figure 7 of the drawings. As previously indicated, the die block is normally in a position wherein the groove 41 therein is in alignment with the path of travel of the stock so as to provide for unobstructed passage of the latter by the feed mechanism. However, as soon as the required amount of stock has been fed by the said mechanism and during the interval of rest of the latter, the die block is swung inwardly with the result that the end portions of the wire stock corresponding to the spoke are displaced laterally inwardly relative to the remaining portions of the stock. In this connection, it is to be noted that the stock is guided in a rectilinear path as it is fed to the bending mechanism by means of a fixed die 45 so that by spacing the swinging die 40 a predetermined distance inwardly from the fixed die 45 as shown in Figure 8, movement of the die 40 to bend the end portion of the stock causes the section of the stock connecting the bent portion to the remaining portion of the stock to assume an angular relation relative to the latter portions. This angular connecting portion corresponds to the spoke tenon designated in Figure 8 by the reference character 46 and the length thereof is determined by the space provided between the outer edge of the swinging die 40 and the inner edge of the fixed die 45. The degree of inclination of the tenon.

on the other hand, is controlled by the extent of swing of the die 40 which will be presently described.

Referring now to the means provided herein for swinging the die 40 to accomplish the bending function, it will be noted from Figures 6 and 7 that this means comprises a horizontally reciprocable slide 47 having an abutment 48 projecting beyond the inner end thereof in a position to engage the die 40 to swing the latter upon movement of the slide 47 inwardly. The abutment 48 is preferably in the form of an adjustable screw so as to provide for varying the extent of swinging movement of the die and accordingly, the degree of bending of the stock. In the interest of simplicity, the slide 47 is further provided with a knife 49 having a portion extending beyond the inner end of the slide 47 and so arranged relative to the abutment 48 as to permit the necessary bending of the spoke portion of the stock prior to severing this portion from the remainder of the stock. In other words, the arrangement is such that upon initial movement of the slide 47, the abutment 48 engages the die 40 to bend the end portions of the stock, and upon continued movement of the slide 47, the knife 49 engages the stock immediately adjacent the delivery end of the fixed die 45 to sever the portion of the stock corresponding to the spoke from the remainder of the stock.

The slide 47 is operated in timed relation to the feeding mechanism hereinbefore described by means of an eccentric 50 secured to the cam shaft 19 and connected to a pitman 51 having the free end thereof pivotally connected to a slidable cam block 52 having a cam groove 53 therein for receiving a pin 54 extending laterally from the slide 47. The development of the cam groove is such as to provide for the necessary reciprocation of the slide 47 to accomplish its combined functions hereinbefore stated.

As soon as the portion of the stock corresponding to the length of a spoke blank is severed from the remainder of the stock, the spoke blank is deposited upon a vertically reciprocable platform 55. The platform 55 is formed with a plurality of equally spaced transversely extending grooves 56 for receiving the spoke blanks and maintaining the same in predetermined positions thereon. The outermost groove 56 or the groove adjacent the path of travel of the stock is so positioned as to receive the spoke blanks as soon as they are severed from the stock, and in order to insure proper positioning of the severed blanks in the aforesaid groove 56, suitable spring fingers 57 may be provided for engaging opposite end portions of the spoke blank and guiding the same into the said groove.

Positioned upon opposite sides of the platform 55 and mounted for reciprocation in a substantially horizontal plane is a pair of conveyors 58 having transverse grooves 59 therein normally arranged in alignment with the grooves 56 for receiving the end portions of the spoke blanks. In this connection, it is to be noted that the grooves 59 in the portion of the conveyor adjacent the tenons on the spoke blanks are inclined upwardly at an angle corresponding in effect to the angle of inclination of the tenons so as to insure proper positioning of the tenons for subsequent operations. The foregoing construction is so designed that the supporting surfaces of the conveyor are located at a lower elevation than the platform when the latter is in its normal or uppermost position so that it necessarily follows that the spokes are normally supported by the platform with the ends thereof spaced above the conveyors. This arrangement permits reciprocation of the conveyors without interfering with the spoke blanks on the platform.

In general, the foregoing arrangement is such that as soon as a spoke blank is deposited within the outermost groove 56 on the platform 55, the latter is lowered causing the ends of the spoke blank to engage within the grooves formed in the conveyors. The platform is lowered to such an extent that the spoke blanks are supported solely at the ends thereof by the conveyors. The conveyors are then moved inwardly sufficiently to advance the spoke blank a distance corresponding to the distance between the grooves 56 on the platform and the platform 55 is then raised to its initial position as shown in Figure 7 of the drawings. Upon raising the platform, it will be apparent that the spoke blank which had previously occupied the outermost groove 56 in the platform will now assume a position within the next adjacent groove 56 owing to the fact that the conveyors have advanced the blanks the predetermined distance above mentioned.

For reciprocating the conveyors and platform in the aforesaid directions and in timed relation to each other, I provide a pair of cams 60 and 61 respectively secured to the cam shafts 18 and 19. The cam 60 is operatively connected to the platform 55 for raising and lowering the same by means of a link 62 pivotally connected in any suitable manner intermediate the ends thereof to the frame of the machine and having the outer end engageable within a cam groove 63 formed in the cam 60 and the inner end pivotally connected to the lower end of a vertical slide 64. The slide 64 is secured at the upper end in any suitable manner to the platform 55 and is accurately guided throughout its movement by means of suitable ways 65 secured to the frame of the machine on opposite sides of the slide. The conveyors 58, on the other hand, are actuated by the cam 61 operatively connected to the conveyors through the intermediary of a system of levers. In detail, the aforesaid connection comprises a bell crank lever 66 pivotally connected to the frame of the machine as at 67 and having one arm pivotally connected to the conveyors as at 68. The other arm of the bell crank lever is in turn pivotally connected to the rear end of a link 69 having the forward end engaging within a cam groove 70 formed in the cam 61. The link 69 is pivotally connected intermediate the ends thereof to the frame of the machine as at 71 so as to provide for a rocking movement thereof by the cam to effect a reciprocation of the conveyors through the medium of the bell crank 66. The cam grooves 63 and 70 are so fashioned as to provide for movement of the conveyors and platform in timed relation to each other as well as in timed relation to the bending, severing and feeding mechanisms hereinbefore described.

The conveyors, in addition to moving the spokes inwardly away from the bending mechanism as previously stated, also function to convey the spoke blank occupying the end groove in the platform to a position in registration with a suitable gripping die designated generally in Figure 2 by the reference character 72. The gripping die 72 comprises a stationary section 73 fixed to the machine frame and a movable section 74 mounted for reciprocation toward and away from the stationary section 73. Both of the above sections are designed and positioned to receive spoke blanks from the conveyor and the blanks are positioned longitudinally relative to the die 72 during movement of the conveyors toward the die by means of vertical guides 72' positioned on opposite sides of the conveyors for engagement with the free ends of the blanks. As shown in Figure 6, the guides 72' taper inwardly toward the die and the distance between the inner ends thereof is substantially equal to the length of the spokes. The spoke blanks are transferred from the conveyors to a position between the dies by means of flexible fingers 75 mounted for reciprocation in a vertical plane directly above the innermost spoke supported by the conveyors. The foregoing construction is such that upon inward movement of the conveyors 58 to advance the spoke blanks supported thereon, the flexible fingers 75 are lowered to such an extent as to grip the innermost spoke blank and suspend the same during the interval the conveyors are moved to their outermost or normal positions. In this connection, it is to be noted that when the conveyors are in their normal positions, the inner ends of the same are spaced out of the vertical path of travel of the fingers so as to permit the latter to lower the spoke blank gripped thereby to a position between the co-operating die members 73 and 74. As soon as the spoke blank is properly positioned between the die sections, the fingers are returned to their uppermost positions and the movable die section is advanced towards the permanent die section to grip the spoke blank therebetween.

In order to effect a movement of the movable die section toward the fixed die section in timed relation to the operation of the fingers and remaining mechanisms of the apparatus, I provide a suitable eccentric designated generally by the reference character 76 suitably secured to the cam shaft 18 for actuation thereby. The eccentric 76 is operatively connected to a rod 77 for reciprocating the latter and the rod 77 is in turn operatively connected to the movable die 74 for actuating the same relative to the fixed die 73. The fingers 75, on the other hand, are adjustably mounted as at 78 upon a suitable vertically reciprocable carrier 79 having an operative connection with a link 80 pivotally connected intermediate the ends thereof to the frame of the machine as at 81. The free end of the link 80 is connected through the medium of suitable linkage 82 to a cam 83 fixed to the cam shaft 19 for operation thereby. As above stated, the eccentric 76 and cam 83 are so developed as to actuate the die and fingers in timed relation to each other and to their associated mechanisms.

After a spoke blank has been suitably clamped between the relatively movable die sections 73 and 74, the heading punches 84 and 85 are respectively actuated to successively gather the metal on the tenons of the spoke and subsequently form the enlarged seat or head portion on the tenon. As previously stated, the seat or head portions on the tenons of the spokes are formed concentric with the axis of the tenons and in the present instance this is accomplished by moving the punches simultaneously in directions transverse to each other.

In detail, the heading punches 84 and 85 are fixed to a suitable die holder 86 secured to a carrier 87 which in turn is mounted for reciprocation in a substantially vertical plane upon the rear end of a horizontally reciprocable member 88. The member 88 is slidably mounted upon the frame of the machine for reciprocation in a horizontal direction and is connected by means of a pitman 89 to the crank shaft 17. The carrier 87, on the other hand, is actuated by a cam or eccentric 89' secured to the cam shaft 19 and operatively connected through the intermediary of a lost motion connection 90 to the lower end of the carrier 87. The lost motion connection 90 provides for the desired angular travel of the punches independent of the cam 89' which is important for the purpose to be presently set forth. In detail, the connection between the carrier 87 and the cam 89' comprises a link 91 having spaced rollers 92 at the forward end thereof for engaging opposite sides of the cam as shown in Figures 3, 12 and 13. The forward end of the link 91 is pivotally connected to a bracket 94 mounted upon the stub shaft 95. The bracket 94 is composed of two parts 96 and 97 arranged upon opposite sides of the shaft 95. The part 96 is merely journaled upon the shaft 95, while the part 97 is secured to the shaft 95 and connected to the part 96 upon opposite sides of the axis of the shaft by means of the spring elements 98. The arrangement is such as to provide for restricted rocking movement of the bracket part 97 relative to the part 96 positively connected to the cam through the intermediary of the link 91. For operatively connecting the rockshaft 95 with the lower end of the carrier 87, the shaft 95 is provided intermediate the ends thereof with a substantially U-shaped portion designated in Figure 4 by the reference character 99. The opposite legs of the U-shaped portion 99 are pivotally connected by means of the pins 100 to a suitable channel guide 101 constructed to slidably receive a T-shaped block 102 pivotally connected by means of the pin 103 to the lower end of the carrier 87. As will be apparent from Figures 12 and 13, the slidable connection between the guide and block provides for movement of the carrier 87 toward and away from the die 72 during reciprocation of the carrier in a transverse direction.

Thus, from the foregoing it will be apparent that the above described connection between the carrier 87 and the cam shaft 19 is such as to permit the eccentric 89' on the latter to raise and lower the carrier at predetermined intervals and at the same time to provide for lowering the carrier independent of the cam. In detail, assuming that the eccentric 89 is moved from the position thereof shown in Figure 12 to the position shown in Figure 13, it will be noted that such movement of the cam will cause the link 91 to move rearwardly in the direction of the arrow 104. Movement of the link 91 in the direction of the arrow causes a rocking movement of the freely movable part 96 of the bracket 94 and the latter, through the flexible connection therebetween and the fixed parts 97, effects a rocking movement of the shaft 95 in the direction of the arrow 105. Rocking of the shaft 95 in the aforesaid direction causes a corresponding rocking movement of the U-shaped portion 99 and through the pivotal connection between the latter and guide 101, effects an upward movement of the carrier 87. In this connection, attention is again directed to the fact that owing to the sliding connection established between the block 102 on the carrier and the guide 101 connected to the shaft, the carrier may be reciprocated by the pitman 89 without interfering in any way with the relative vertical sliding movement of the carrier.

Assuming now that it is desired to move the carrier 87 downwardly independent of the eccentric 89′, it will be apparent that such movement is permitted due to the restricted relative movement afforded between the bracket sections 96 and 97. In other words, movement of the carrier 87 downwardly will effect a rocking movement of the shaft 95 and accordingly, the fixed part 97, and since the latter is connected to the part 96 through the lost motion connection above mentioned, limited rocking movement thereof will be permitted relative to the part 96 depending upon the degree of lost motion provided.

The provision of a connection of the type previously described permits obtaining one of the principal objects of this invention which, as stated above, is to form the enlarged portions on the tenons of the spokes by exerting pressure on the latter axially of the same. The foregoing object is secured by supporting the spokes in the gripping dies in the position shown in Figure 3 and moving the heading punches 84 and 85 downwardly at the same time they are moved toward the die. In the specific embodiment of the invention, the heading dies are moved in effect at an angle toward the tenons of the spoke determined in accordance with the inclination of the tenon portions of the spokes. In order to effect the desired angular travel of both of the heading punches 84 and 85, I provide a pair of cam faces 106 and 107 on the carrier 87 adapted to successively engage a roller 108 journalled upon a fixed part of the machine frame. The cam surfaces are inclined to the horizontal at an angle corresponding to the angle of inclination of the tenons on the spokes and extend in the same direction, as will be evidenced from Figure 3 of the drawings. The roller 108, on the other hand, is so positioned with respect to the die for gripping the spoke blanks as to engage the cam surfaces on the carrier 87 to urge the latter downwardly during the heading operation.

Assuming now that the various parts of the spoke heading mechanism are in the position illustrated in Figure 12 and that a spoke is clamped by the die sections, it will be noted that continued rotation of the cam 89′ in the direction of the arrow 110 will cause the carrier 87 to move downwardly to accurately position the cam face 106 relative to the roll 108. The member 88 is then moved forwardly to advance the heading punch 84 toward the tenon portion of the spoke and since the roller 108 is positioned as previously indicated, the same will function to cam the carrier 87 downwardly as the punch head 84 is gathering the metal upon the tenon. In this connection, it is to be noted that the cooperating engaging faces of the heading punches and the gripping die are arranged at right angles to the tenon portion of the spoke, with the result that as the heading punch 84 is being moved in a direction axially of the tenon due to the combined horizontal and downward movement of the carrier, a shoulder will be formed on the tenon substantially concentric therewith. Upon completion of the gathering operation by the heading punch 84, the member 88 is caused to move away from the die to disengage the roller 108 from the cam face 106 whereupon the eccentric 89′ effects an upward movement of the carrier 87 to position the cam surface 107 in operative relation to the fixed roll 108. The member 88 is then again moved rearwardly to advance the heading punch 85 toward the spoke tenon and owing to the fact that the inclined cam surface 107 is parallel to the surface 106, it will be apparent that the heading punch 85 will also be moved in a direction axially of the tenon into engagement therewith to perform the final operation of forming an annular seat or head portion on the tenon of the spoke.

In the event it is desired to form a head upon the opposite end of the spoke blanks, the apparatus may be provided with heading punches 111 and 112 similar to the punches 84 and 85. The punches 111 and 112 may be operated to head the ends of the spoke opposite the tenons at the same time the enlarged head portions are formed on the tenons and if desired, practically the same design of mechanism may be provided for actuating the punches 111 and 112 as has previously been described for operating the punches 84 and 85. In connection with the operation of the punches 111 and 112, however, it is obvious that since the ends of the spoke adapted to be headed thereby are in substantial alignment with the punches, it is not necessary to provide means for moving the punch heads in an angular direction in the manner in which the punch heads 84 and 85 are moved.

Operation

Referring now briefly to the operation of the apparatus, it will be noted that wire stock is introduced at the forward end of the machine and is fed at intermittent intervals to the severing and bending means by feeding mechanism including the feed roll 28. As previously stated, the feeding mechanism is so designed as to advance predetermined lengths of stock to the bending and severing means at intermittent intervals. As soon as the desired length of stock has been fed by the feed mechanism and during the interval of rest of the latter, the bending block 48 is moved inwardly by the slide 47 to form the tenon portions on the spoke blank. After the stock has been suitably bent, the slide 47 functions to actuate the cutting blade 49 to sever the stock at the juncture of the bent portion with the remainder of the stock so as to form a spoke blank with an angularly disposed end portion. The spoke blanks thus fashioned are conveyed through the medium of the platform 55 and conveyors 58 to a position directly below the gripping fingers 75. The gripping fingers 75 are then automatically lowered to grip the spoke blanks and deposit the same between cooperating relatively movable die sections whereupon the latter are actuated to grip the spoke preparatory to the gathering and heading operations. After a spoke blank has been properly gripped by the die, the heading punches 84, 85, 111 and 112 are actuated in the manner just described to gather and form head portions upon the tenons and opposite ends of the spoke. Upon completion of the heading operations, the die sections are moved relative to each other to permit removal of the finished spoke therefrom and provide for the insertion of another spoke blank therebetween. It being understood that all of the operations performed on the spoke by the apparatus are accomplished automatically in timed relation to each other without manual assistance, thereby materially expediting production and decreasing the cost of manufacture.

While the apparatus described and shown in detail herein has been found suitable for performing the several operations enumerated above in fashioning wire spokes, nevertheless, it should be understood that various other types of apparatus and mechanisms may be employed for performing these operations and accordingly the method of manufacturing wire spokes contemplated by this invention should not be construed to be limited by the particular type of apparatus illustrated herein.

What I claim as my invention is:

1. In apparatus for fashioning wire spokes, means for holding a spoke blank having an angularly extending end portion in a fixed position with the said end portion projecting beyond the holding means in predetermined relationship to the remaining portions of the blank, a plurality of heading dies successively movable into engagement with the angularly extending end portion for forming an enlargement thereon, and means for moving said dies in a path coincident with the axis of the said angularly disposed end portion.

2. In apparatus for forming wire spokes, means for advancing a strip of wire stock along a predetermined path, means for periodically bending portions of the stock relative to the remaining portions thereof, means for severing the bent portions from the stock, a punch for forming an enlargement on the bent portions of the stock, means for conveying the said bent portions to a position to be operated upon by said punch, and means for actuating said punch in timed relation to said last-mentioned means.

3. In apparatus for fashioning wire spokes, means for advancing wire stock along a predetermined path, means for periodically bending portions of the stock laterally from the remaining portions thereof to form angularly extending portions, means for severing the stock to form spoke blanks with the angularly extending portions at one end thereof, a punch for forming an enlargement upon the angularly extending portion of the spoke blank, means for conveying said blanks to a position to be operated upon by said punch, and means for moving said punch in a path coincident with the axis of the angularly extending portion aforesaid during the punching operation.

4. In apparatus for fashioning wire spokes, means for advancing a strip of wire stock along a predetermined path, means for periodically bending portions of the stock laterally relative to the remaining portions forming angularly extending portions, means for severing the bent portions from the stock to form spoke blanks with the angularly extending portions at one end thereof, a holder spaced from the bending and severing means, means for conveying the spoke blanks to said holder, means operable in timed relation to the conveying means for successively positioning the spoke blanks within the holder and for actuating the latter to grip the blanks, and means operable in timed relation to said last-mentioned means for fashioning an enlargement upon the angularly disposed portions of the blanks.

5. In apparatus for fashioning wire spokes, means for holding a spoke blank having an angularly extending end portion in a fixed position with said end portion projecting beyond the holding means in predetermined relationship to the remaining portions of the blank, means forming an enlargement upon the angularly extending portion including a punch, means for actuating the punch including, a carrier for the punch, means for moving said carrier toward the end aforesaid of the spoke blank, and means for simultaneously moving said carrier in a path transverse to the path of movement aforesaid, said last-named means comprising a cam developed to effect a resultant angular movement of the punch in a direction corresponding to the angulation of the end portion aforesaid of the spoke blank.

6. In apparatus for fashioning wire spokes, means for holding a spoke blank having an angularly extending end portion in a fixed position with the said end portion projecting beyond the holding means in predetermined relationship to the remaining portions of the blank, a punch carrier having a plurality of punches thereon for successively engaging the angularly extending end portion of the spoke blank to form an enlargement on the same, means operatively connected to said carrier for moving the same in a direction to successively position the punches for operation upon the angularly extending end portion, means operable in timed relation to said last-mentioned means for moving the carrier in a transverse direction toward and away from the end portion, and means operable independent of both of the said last-mentioned means for urging said carrier in a direction to effect a movement of the punches in a path coincident with the axis of the angularly extending end portions aforesaid of the blank.

7. In apparatus for fashioning wire spokes, means for holding a spoke blank having an angularly extending end portion in a fixed portion with the said end portion projecting beyond the holding means in predetermined relationship to the remaining portions of the blank, a punch carrier having a punch for forming an enlargement upon the angularly extending end portion aforesaid of the blank, means for moving the carrier toward and away from the end portion of the blank, and means for simultaneously moving the carrier in a transverse direction to effect a relative movement of the punch in a path coincident with the axis of the angularly extending end portion of the spoke blank.

8. In apparatus for fashioning wire spokes, means for advancing a strip of wire stock along a predetermined path, means for displacing a predetermined length of the stock laterally with respect to the remaining portions of the stock with the axis of the former substantially parallel to the axis of the latter and thereby forming an angularly extending portion, means for severing the predetermined length of the stock from the remaining portion of the stock at the juncture of the angularly extending portion with the said remaining portion of the stock, and means for subsequently upsetting the end of said angularly extending portion.

EDWIN P. WILSON.